United States Patent
Saiki et al.

(10) Patent No.: US 7,189,773 B2
(45) Date of Patent: Mar. 13, 2007

(54) PLASTISOL COMPOSITION, GELLED FILM AND ARTICLE

(75) Inventors: Shinji Saiki, Nagoya (JP); Toshihiro Kasai, Owariasahi (JP); Yoriko Arai, Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/469,041

(22) PCT Filed: Jul. 4, 2002

(86) PCT No.: PCT/JP02/06805

§ 371 (c)(1),
(2), (4) Date: Aug. 26, 2003

(87) PCT Pub. No.: WO03/004568

PCT Pub. Date: Jan. 16, 2003

(65) Prior Publication Data

US 2004/0072925 A1    Apr. 15, 2004

(30) Foreign Application Priority Data

Jul. 4, 2001    (JP) .............................. 2001-203977

(51) Int. Cl.
 C08K 5/06    (2006.01)
(52) U.S. Cl. ...................... 524/378; 524/366; 524/376; 524/377
(58) Field of Classification Search ................ 524/309, 524/333–378
See application file for complete search history.

(56) References Cited

U.S. PATENT DOCUMENTS

| | | | | |
|---|---|---|---|---|
| 3,050,412 A | * | 8/1962 | Coe | ............................ 428/473 |
| 4,020,966 A | * | 5/1977 | Wszolek | ...................... 215/349 |
| 4,119,604 A | * | 10/1978 | Wysong | ...................... 524/377 |
| 4,199,486 A | | 4/1980 | Boessler et al. | |
| 4,244,914 A | * | 1/1981 | Ranalli et al. | ............... 264/515 |
| 4,287,177 A | * | 9/1981 | Nakashima et al. | ..... 424/78.06 |
| 5,441,994 A | | 8/1995 | Moriga et al. | |
| 5,965,645 A | * | 10/1999 | Beck et al. | .................. 524/197 |
| 6,800,682 B1 | * | 10/2004 | Windhoevel et al. | ........ 524/366 |

FOREIGN PATENT DOCUMENTS

| | | | |
|---|---|---|---|
| JP | 7-53934 | | 2/1995 |
| JP | 7-233299 | | 9/1995 |
| JP | 8-100098 | | 4/1996 |
| JP | 9-216984 | | 8/1997 |
| JP | 10-231409 | | 9/1998 |
| JP | 2000-239473 | | 9/2000 |
| JP | 2000-281857 | * | 10/2000 |
| JP | 2001-49073 | | 2/2001 |
| JP | 2001-329135 | | 11/2001 |
| JP | 2002-30194 | | 1/2002 |
| WO | WO 97/00912 | * | 6/1996 |
| WO | WO 00/01748 | | 1/2000 |
| WO | WO 01/21707 | | 3/2001 |

* cited by examiner

*Primary Examiner*—Peter Szekely
(74) *Attorney, Agent, or Firm*—Oblon, Spivak, McClelland, Maier & Neustadt, P.C.

(57) ABSTRACT

A plastisol composition of the present invention comprises a polyalkylene glycol and/or a polyalkylene glycol derivative (X) and polymer particles (Y). This composition uses non-halogen based polymer particles with no halogen atoms, which do not emit materials such as hydrogen chloride gas or dioxin on incineration, and does not require a phthalic acid based plasticizer as a dispersion medium, and consequently provides an extremely large reduction in environmental impact. Furthermore, by using the plastisol composition, a gelled film having no bleed out of the dispersion medium, superior dispersion medium retention characteristics, workability, and processability is obtained. In addition, by using the plastisol composition of the present invention, a gelled film or an article with excellent mechanical characteristics are provided. The composition of the present invention is suitably used as materials such as wallpaper, floorings, vehicle undercoats, and vehicle body sealers.

13 Claims, No Drawings

PLASTISOL COMPOSITION, GELLED FILM AND ARTICLE

TECHNICAL FIELD

The present invention relates to a plastisol composition using a polyalkylene glycol and/or a polyalkylene glycol derivative as a dispersion medium, a gelled film and an article.

BACKGROUND ART

Vinyl chloride based sols comprising a vinyl chloride based resin dispersed in a phthalic acid based plasticizer such as dioctyl phthalate (DOP) provide excellent workability and superior physical properties of the product film, and are consequently widely used in many industrial fields.

However, in recent years, with greater attention being paid to environmental issues, problems have arisen with vinyl chloride based sols due to toxic materials derived from vinyl chloride based resins, such as the generation of hydrogen chloride gas on incineration and the resulting damage to incinerators, acid rain, and the generation of dioxin during incineration.

Accordingly, plastisols using alternative resins to vinyl chloride based resins are being actively investigated.

Moreover, environmental issues have also been identified for many general purpose plasticizers such as the phthalate ester based plasticizers which are used in vinyl chloride based plastisols.

Based on this background, Japanese Unexamined Patent Application, First Publication No. Hei 7-53934 and Japanese Unexamined Patent Application, First Publication No. Hei 7-233299 propose acrylic plastisols using an acrylic based resin as an alternative to the vinyl chloride based resin. By using an acrylic based resin instead of a vinyl chloride based resin, these acrylic plastisols are novel proposals based on environmental concerns, and offer superior performance from an environmental viewpoint as they do not generate hydrogen chloride gas or dioxin even when incinerated.

However, these acrylic plastisols use a phthalate ester based plasticizer, and as such are unable to completely resolve all the environmental problems.

Japanese Unexamined Patent Application, First Publication No. Hei 10-231409 discloses an acrylic based plastisol which uses a benzoate ester based plasticizer as an example of an acrylic based plastisol which uses a plasticizer other than a phthalate ester based plasticizer. Furthermore, Japanese Unexamined Patent Application, First Publication No. Hei 8-100098 discloses an acrylic sol which uses a phosphate ester based plasticizer. In addition, Japanese Unexamined Patent Application, First Publication No. 2000-281857 discloses an acrylic based plastisol using a combination of an ether ester based plasticizer and a benzoate ester plasticizer. According to these proposals, because a phthalate ester based plasticizer is not used, environmental problems can be resolved.

However, the plasticizers disclosed in these patent applications display inadequate compatibility with the acrylic resin, and consequently, in gelled films formed with these types of acrylic based plastisols, the plasticizer exists in a free state within the gelled film. As a result, if the gelled film is used for a long period, or used under particular conditions such as high temperature conditions, the plasticizer travels to and then bleeds out from the surface of the gelled film. When the plasticizer bleeds out from the gelled film, the gelled film becomes brittle, and the mechanical characteristics such as the strength, the ductility, the flexibility, and the like tend to deteriorate. In addition, in cases in which ink or the like contacts the gelled film, the ink may transfer onto the gelled film.

DISCLOSURE OF INVENTION

An object of the present invention is to provide a plastisol composition with no environmental problems, wherein the dispersion medium suffers almost no bleed out from a produced gelled film, and the gelled film has superior dispersion medium retention characteristics and superior mechanical characteristics.

As a result of intensive investigations, the inventors of the present invention found that polyalkylene glycols and/or polyalkylene glycol derivatives differ from conventional plasticizers such as phthalate esters, and display low toxicity and have little impact on the environment, and are consequently extremely useful as plasticizers. Accordingly, they found that by using a polyalkylene glycol and/or a polyalkylene glycol derivative instead of a plasticizer as the dispersion medium within a plastisol, the problems described above could be solved, and were hence able to complete the present invention.

The main aspects of the present invention are a plastisol composition including a polyalkylene glycol and/or a polyalkylene glycol derivative (X) and polymer particles (Y), and a gelled film, and a gelled film in which the quantity of bleed out of the dispersion medium from the gelled film of 2 mm thick when the gelled film is retained for 24 hours at 80° C. under a pressure of 200 Pa is no more than 1% of the total quantity of the dispersion medium.

BEST MODE FOR CARRYING OUT THE INVENTION

The present invention is explained by the following more detailed description.

[Plastisol Composition]

A plastisol composition of the present invention comprises a polyalkylene glycol and/or a polyalkylene glycol derivative (X) (hereafter referred to as a component (X)), and polymer particles (Y).

There are no particular restrictions on the polyalkylene glycol and/or polyalkylene glycol derivative used in the present invention, and known compounds can be used. A polyalkylene glycol derivative refers to a compound with a structure in which either a portion, or all of the hydroxyl groups positioned at the terminals of the polyalkylene glycol have been replaced with other functional groups.

Specific examples of the polyalkylene glycol include polymethylene glycol, polyethylene glycol, polypropylene glycol, polybutylene glycol, polyhexamethylene glycol, polyalkylene glycols with at least two types of glycol unit such as copolymers of ethylene oxide and propylene oxide, and branched polyalkylene glycols using polyfunctional alcohols such as glycerine.

Specific examples of the polyalkylene glycol derivative include compounds in which the terminals have been etherified such as monoalkoxypolyalkylene glycols and dialkoxypolyalkylene glycols.

Of these, compounds represented by a general formula (1) shown below are preferred as the component (X) as they display excellent affinity with acrylic polymer particles, and also display excellent dispersibility of acrylic polymer particles.

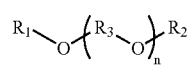 (1)

In the formula, $R_1$ and $R_2$ each represent, independently, a hydrogen atom or an alkyl group having 1 to 10 carbon atoms, and $R_3$ represents a straight chain or branched alkylene group having 2 to 12 carbon atoms. Furthermore, n which represents the degree of polymerization of the polyether is an integer within a range from 5 to 200, although the lower limit of the range is preferably an integer of 10 or more. In addition, the upper limit of the range is preferably an integer of 100 or less, and integers of 50 or less are even more desirable. In cases in which n is less than 5, the molecular weight of the component (X) is small, and consequently during the heating process used for forming the gelled film, the volatile organic compounds (VOC) within the plastisol composition tend to be more prone to volatilization. In contrast, if n is greater than 200, then the viscosity of the component (X) increases, and the handling of the product plastisol composition tends to deteriorate.

In addition, among the compounds represented by the general formula (1), using either a single compound or a combination of two or more compounds selected from among polyethylene glycols in which the number of carbon atoms of $R_3$ is 2, polypropylene glycols in which the number of carbon atoms of $R_3$ is 3, and polybutylene glycols in which the number of carbon atoms of $R_3$ is 4, is particularly preferred. The reasons for this preference are that these polyalkylene glycols display excellent affinity with acrylic polymer particles and are consequently able to effectively plasticize the produced plastisol composition, and that these polyalkylene glycols are produced industrially on a large scale and are consequently of low cost.

There are no particular restrictions on the structure of the polymer particles (Y) used in the present invention provided the particles are capable of being dispersed within the dispersion medium, and suitable examples include uniform structures, core/shell type structures or gradient structures in which the composition varies in a substantially continuous manner.

Of these, core/shell type structures and gradient structures allow the internal composition of the polymer particles to be different from the composition of the surface layer. Accordingly, by using a structure in which, for example, a polymer with good co-solubility with the dispersion medium is provided within the internal sections of the particles, the storage stability of the composition can be ensured, and when the composition is heated during film formation, the polymer present inside the core/shell structure or gradient structure, and the component (X) undergo dissolution, enabling the dispersion medium to be retained within the gelled film. In this manner, core/shell structures or gradient structures are preferred since they allow good storage stability of the plastisol and good dispersion and retention of the polymer particles within the dispersion medium, and also produce gelled films with good physical properties.

The polymer particles (Y) can be produced by known polymerization methods, including emulsion polymerization in a water based medium, seed emulsion polymerization, soap-free polymerization, suspension polymerization, microsuspension polymerization, dispersion polymerization in an organic medium, dispersion polymerization in a water/organic mixed medium, and precipitation polymerization in an organic medium. Furthermore, the polymer particles (Y) can also be produced by a combination of a plurality of these known polymerization methods.

In the present invention, in those cases in which polymer particles (Y) with a core/shell structure are used, emulsion polymerization, seed emulsion polymerization, and soap-free polymerization are preferred from among the polymerization methods described above since they provide good control of the particle structure and enable a high molecular weight polymer to be produced. Furthermore, microsuspension polymerization methods are also preferred since the particle size distribution of the polymer particles is narrow, enabling polymer particles with a uniform particle size to be obtained relatively easily, and since a core/shell can be formed by a post treatment such as alkali hydrolysis, following the polymerization.

The method of recovering a powder of the polymer particles (Y) from the polymer dispersion obtained using the polymerization methods described above can be any method which enables recovery of the polymer in a particle state, and suitable examples include spray drying methods, coagulation methods, freeze drying methods, centrifugation methods, and filtering methods.

Of these, spray drying methods are preferred since they enable production of the polymer particles (Y) with good productivity, at low cost, and with ready control of the form of the polymer particles, and because a plastisol composition comprising polymer particles (Y) obtained by spray drying is capable of forming a gelled film with superior mechanical characteristics.

There are no particular restrictions on the particle size of the polymer particles (Y), and this size can be selected appropriately in accordance with the desired performance of the product composition and the gelled film that is formed.

For example, in those cases in which the viscosity of the plastisol composition is to be lowered, coating workability improved, the dispersion stability of the polymer particles within the dispersion medium improved, the storage stability improved, and the film forming properties of the plastisol composition also improved, the lower limit for the volume average particle size of the primary particles of the polymer particles (Y) is preferably 0.01 µm or greater, and even more preferably 0.1 µm or greater, and most preferably 0.5 µm or greater. Furthermore, the upper limit is preferably 50.0 µm or less, and even more preferably 10.0 µm or less, and most preferably 2.0 µm or less.

If the volume average particle size of the primary particles of the polymer particles (Y) is less than 0.01 µm, then the viscosity of the product plastisol composition will increase, and the coating workability tends to deteriorate. Furthermore, the dissolution speed of the polymer particles (Y) increases, and the storage stability of the plastisol composition tends to deteriorate. On the other hand, if the volume average particle size of the primary particles of the polymer particles (Y) is greater than 50 µm, then, the fusion of the polymer particles (Y) tends to worsen, when an applied coating of the plastisol composition is heated to form a gelled film.

There are no particular restrictions on the molecular weight of the polymer particles (Y) used in the present invention, and the molecular weight can be selected appropriately in accordance with the desired performance of the product composition and the gelled film that is formed.

For example, from the viewpoint of storage stability of the composition, the weight average molecular weight of the polymer particles (Y) is preferably 100,000 or more, and even more preferably 300,000 or more, and most preferably 500,000 or more. Furthermore, from the viewpoint of the film forming properties of the composition on heating, the molecular weight is preferably 5,000,000 or less, and even more preferably 2,000,000 or less, and most preferably 1,000,000 or less.

There are no particular restrictions on the structure of the polymer particles (Y) used in the present invention. The structures may be formed only from primary particles, or may be secondary structures formed from secondary particles such as particles in which primary particles are cohered with weak cohesion, particles in which primary particles are cohered with strong cohesion, and particles in which primary particles are mutually fused and adhered under heating. The structure of the polymer particles (Y) can be selected appropriately in accordance with the desired performance of the plastisol composition of the present invention and the articles formed therefrom, such as the improvement of the dispersion stability of the polymer particles (Y) relative to plasticizers, or the prevention of stirring of powder.

For example, if the structure of the polymer particles (Y) is a higher order structure with granulated secondary particles, then stirring of powder of the polymer particles can be suppressed, the fluidity of the product plastisol composition can be improved, and the handling and coating workability (hereinafter referred to workability) can be improved.

In the present invention, there are no particular restrictions on the polymer particles (Y), and known polymer particles can be used.

Among known polymer particles, acrylic based polymer particles are particularly preferable because they display good affinity with the component (X), and the polymer particles (Y) can be readily plasticized by heating. Furthermore, gelled films produced from plastisol compositions using acrylic based polymer particles as the polymer particles (Y) provide a markedly superior effect that plasticizer is prevented from bleeding out, and more stable than gelled films formed from conventional plastisols. As a result, when a plastisol composition using acrylic based polymer particles of the present invention is used, a gelled film with extremely good mechanical characteristics can be formed.

In those cases in which acrylic based polymer particles are used as the polymer particles (Y), there are no particular restrictions on the acrylic based polymer particles provided they are polymer particles produced by polymerization of an acrylic monomer.

The acrylic based polymer particles are preferably particles formed from polymers (1) comprising, as structural components, methyl methacrylate units, methacrylate ester units (A1) which are esters of an alcohol having 2 to 8 carbon atoms and methacrylic acid, and/or acrylate ester units (A2) which are esters of an alcohol having 1 to 8 carbon atoms and acrylic acid, or polymers (2) comprising, as structural components, methyl methacrylate units, and monomer units (B) having a high polarity functional group of at least one selected from the group consisting of carboxyl groups, hydroxyl groups, sulfonic acid groups, phosphoric acid groups, and epoxy groups.

These acrylic based polymer particles display excellent compatibility with the component (X), and are consequently preferred.

The methacrylate ester units (A1) and/or acrylate ester units (A2) which are components of the polymer (1) enable the compatiblity with the component (X) to be controlled freely. Accordingly, when the polymer (1) comprises these ester units (A1) and (A2), thickening can be continuously suppressed, the dispersion stability of the polymer particles can be improved, and the storage stability of the plastisol composition can be improved. This structure is preferable.

Furthermore, by using the components of the polymer (1), the glass transition temperature of the polymer particles can be adjusted as desired, and the mechanical characteristics such as the hardness, strength, ductility, and the modulus of elasticity can be adjusted with ease in accordance with the desired performance of the product article, which is preferable.

In the components of the polymer (1), specific examples of the component (A1) and the component (A2) include (meth)acrylates of straight chain alkyl alcohols such as ethyl (meth)acrylate, n-butyl (meth)acrylate, i-butyl (meth)acrylate, t-butyl (meth)acrylate, hexyl (meth)acrylate, 2-ethylhexyl (meth)acrylate, and octyl (meth)acrylate; or (meth)acrylates of cyclic alkyl alcohols such as cyclohexyl (meth)acrylate.

Among these, n-butyl (meth)acrylate, i-butyl (meth)acrylate, t-butyl (meth)acrylate, and 2-ethylhexyl (meth)acrylate are preferred. These monomers are readily available which is an advantage from an industrial viewpoint.

When the components of the polymer (2) are used, the affinity with components (X) having particularly high polarity tends to be good, which is preferable. Furthermore, the gelled film obtained using the plastisol composition displays good dispersion medium retention and has the effect that plasticizer is prevented from bleeding out of the component (X), which is also preferable.

In the components of the polymer (2), specific examples of the monomer unit (B) with a high polarity functional group include carboxyl group containing monomers such as methacrylic acid, acrylic acid, itaconic acid, crotonic acid, maleic acid, fumaric acid, 2-succinoyloxyethyl-2-methacryloyloxyethylsuccinic acid methacrylate, 2-maleinoyloxyethyl-2-methacryloyloxyethylmaleic acid methacrylate, 2-phthaloyloxyethyl-2-methacryloyloxyethylphthalic acid methacrylate, and 2-hexahydrophthaloyloxyethyl-2-methacryloyloxyethylhexahydrophthalic acid methacrylate; sulfonic acid group containing monomers such as allylsulfonic acid; hydroxyl group containing (meth)acrylates such as 2-hydroxyethyl (meth)acrylate and 2-hydroxypropyl (meth)acrylate; phosphoric acid group containing (meth)acrylates such as 2-(meth)acryloyloxyethyl acid phosphate; and epoxy group containing (meth)acrylates such as glycidyl (meth)acrylate. These monomers are readily available which is an advantage from an industrial viewpoint.

The polymer (2) may also include monomer units (B2) other than methyl methacrylate units and the aforementioned monomer units (B) with a high polarity functional group. Specific examples of the monomer (B2) include carbonyl group containing (meth)acrylates such as acetoacetoxyethyl (meth)acrylate; amino group containing (meth)acrylates such as N-dimethylaminoethyl (meth)acrylate and N-diethylaminoethyl (meth)acrylate; polyfunctional (meth)acrylates such as (poly)ethylene glycol di(meth)acrylate, propylene glycol di(meth)acrylate, 1,6-hexanediol di(meth)acrylate, and trimethylolpropane tri(meth)acrylate; acrylamides and derivatives thereof such as diacetone acrylamide, N-methylol acrylamide, N-methoxymethyl acrylamide, N-ethoxymethyl acrylamide, and N-butoxymethyl acrylamide; as well as styrene and derivatives thereof, vinyl acetate, urethane modified acrylates, epoxy modified acrylates, and silicone modified acrylates.

The components of these polymer particles (Y) and the ratio thereof can be selected appropriately in accordance with the desired performance and intended uses of the articles produced from the plastisol composition of the present invention.

For example, from the viewpoint of improving the storage stability of the plastisol composition and the plasticizer retention characteristics of the gelled film, when the polymer (1) is used, the mass ratio between the methyl methacrylate units, and the methacrylate ester units (A1) and/or the acrylate ester units (A2) is preferably within a range from 100/0 to 20/80, and even more preferably within a range from 100/0 to 40/60.

Furthermore, from the viewpoint of ensuring polymerization stability in an emulsion polymerization, when the polymer (2) is used, the mass ratio between the methyl methacrylate units and the monomer units (B) is preferably within a range from 100/0 to 50/50, and even more preferably within a range from 100/0 to 70/30.

In addition, in those cases in which the polymer particles (Y) are core/shell structures, the polymer comprising the core section and the polymer comprising the shell section can each use a monomer produced by appropriate selection of the components from the aforementioned polymers (1) or the aforementioned polymers (2).

A plastisol composition of the present invention comprises polymer particles (Y) as described above dispersed within a polyalkylene glycol and/or polyalkylene glycol derivative (X) as described above.

In the present invention, there are no particular restrictions on the mass ratio between the component (X) and the component (Y), although ratios within a range from 30/70 to 70/30 are preferred. If the proportion of the component (X) is less than a mass ratio of 30 (and the mass ratio of the component (Y) exceeds 70), then the viscosity of the sol increases and the workability tends to deteriorate, whereas if the proportion of the component (X) is greater than a mass ratio of 70 (and the mass ratio of the component (Y) is less than 30), then the dispersion medium within the plastisol composition tends to bleed out from the gelled film.

Furthermore, there are no particular restrictions on the combination of the component (X) and the component (Y), although based on the relationship between the component (X) and the solubility parameter (hereafter abbreviated as the Sp value) of the polymer particles (Y), the combination described below is preferable in terms of generating superior storage stability of the composition. What is termed here as the Sp value of the polymer particles (Y) refers to the Sp value of the polymer which forms the entire particle when polymer particles (Y) form a uniform structure, or the Sp value of the polymer which forms the shell when polymer particles (Y) form a core/shell structure. Sp values in the present invention are determined by calculations using the known Fedors method, and are reported in units of $(J/cm^3)^{1/2}$.

For example, in the case in which polyethylene glycol is used as the component (X), polymer particles (Y) having an Sp value of 20.5 or less are preferred.

Furthermore, in the case in which polypropylene glycol is used as the component (X), polymer particles (Y) having an Sp value within a range from 19.8 to 20.5 are preferred.

Furthermore, in the case in which polybutylene glycol is used as the component (X), polymer particles (Y) having an Sp value of 19.6 or more are preferred.

In addition, in cases in which the component (X) contains a hydroxyl group, an additional compound (Z) having a functional group which reacts with the hydroxyl group of the component (X) may also be added to a plastisol composition of the present invention. If the compound (Z) with a functional group which can be chemically bonded with the hydroxyl group of the component (X) is also added to the plastisol composition, then, the compound and the terminal hydroxyl group of the component (X) are chemically bonded during film formation under heating, enabling the dispersion medium retention characteristics of the produced gelled film to be improved even further. This component (Z) can be added to the dispersion medium.

Specific examples of the compound (Z) include isocyanates, epoxy compounds, organic acids, and acid anhydrides. These compounds may be used singularly, or in combinations of two or more compounds. Among these, compounds with an isocyanate group are preferred, and from the viewpoint of ensuring good storage stability of the product plastisol composition, blocked isocyanates in which the isocyanate group is protected with a blocking agent, and acid anhydrides are particularly preferred.

In those cases in which a component (Z) is used, the required quantity of the component (Z) can be added to the component (X) to prepare the plastisol composition.

Furthermore, where necessary, reaction inhibitors, reaction accelerators, or dissociation catalysts may also be added to a plastisol composition of the present invention to adjust the reaction rate of the component (X) and the component (Z).

Furthermore, where necessary, a variety of other additives may also be added to a plastisol composition of the present invention.

Examples of these other additives include known plasticizers, fillers such as calcium carbonate, aluminum hydroxide, baryta, clay, colloidal silica, mica powder, quartz sand, diatomaceous earth, kaolin, talc, bentonite, glass powder, and aluminum oxide; pigments such as titanium oxide and carbon black; diluents such as mineral turpentine and mineral spirit; as well as antifoaming agents, mold prevention agents, deodorants, antibacterial agents, surfactants, lubricants, ultraviolet absorbers, fragrances, foaming agents, leveling agents, and adhesives.

However, in order to form a low environmental impact plastisol composition, phthalate ester based plasticizers should preferably not be included.

[Gelled Film]

In a gelled film of the present invention, when a vinyl chloride film of dimensions 50×50×0.07 (mm) is placed on the surface of a gelled film of dimensions 50×50×2 (mm), and the gelled film is then retained for 24 hours at 80° C. with a pressure of 200 Pa applied from the side of the vinyl chloride film, the amount of bleed out of the dispersion medium is 1% or less of the total amount of the dispersion medium.

A gelled film of the present invention, in which little amount of dispersion medium bleeds out, can be produced by using, for example, the aforementioned plastisol composition of the present invention.

There are no particular restrictions on the method of forming a gelled film of the present invention, and, for example, in those cases in which an aforementioned plastisol composition is used, a formation method such as that described below can be used.

[Method of Forming a Gelled Film]

A plastisol composition of the present invention comprising a polyalkylene glycol and/or polyalkylene glycol derivative (X), and polymer particles (Y) is prepared. The plastisol composition is applied to a substrate to form a film, and the film is then heated so as to be gelled, yielding a gelled film.

As a substrate, known materials, including inorganic materials such as glass and metal, or organic materials can be used. Furthermore, there are no particular restrictions on the shape of the substrate, provided a gelled film of the desired shape can be produced.

The method of applying the composition to the substrate can be selected appropriately in accordance with a substrate which enables formation of the desired shape. Specific examples of the application method include known method such as knife coater methods, comma coater methods, gravure printing methods, roll coating methods, rotary silk printing methods, reverse coater methods, spray coating methods, and screen coating methods.

There are no particular restrictions on the gelling conditions used for producing a gelled film of the present invention, and the temperature and treatment time can be selected appropriately in accordance with factors such as the combination of the component (X) and the component (Y).

For example, in cases in which a plastisol composition of the present invention is used, by setting the temperature conditions within a range from 70° to 260° C., and the treatment time within a range from 30 seconds to 90 minutes, a uniform gelled film can be formed. In addition, from the viewpoint of productivity, particularly, the temperature is preferably within a range from 120° to 220° C., and the time within a range from 30 seconds to 30 minutes.

[Article]

An article of the present invention is an article formed from the aforementioned gelled film of the present invention, or an article with a coating formed from a gelled film of the present invention.

Specific examples of the former, namely, articles formed from a gelled film include film like articles such as wallpaper and coatings for vehicle interiors, as well as three dimensionally shaped articles such as general merchandise, toys, and artificial food samples.

Specific examples of the latter, namely, articles with a coating formed from a gelled film include floorings, vehicle undercoats, vehicle body sealers, metal plates or wires coated with gelled films, and articles covered with electrically insulating gelled films.

EXAMPLES

The present invention is explained more detail with reference to examples.

The evaluation methods used in the examples are described below.

In the examples of the present invention, the workability of a plastisol composition was evaluated on the basis of storage stability. Furthermore, the processability of a gelled film was evaluated on the basis of the strength of the gelled film and the quantity of dispersion medium bleed out from the gelled film.

[Weight Average Molecular Weight of Polymer Particles]

Using the measurement conditions listed below, values (polystyrene equivalent values) measured using GPC methods were recorded as the weight average molecular weight.
Apparatus: High speed GPC Apparatus HLC-8020, manufactured by TOSOH CORPORATION
Column: Three TSKgelGMH$_{XL}$ columns linked in series, manufactured by TOSOH CORPORATION
Oven temperature: 38° C.
Eluting solvent: tetrahydrofuran
Sample concentration: 0.4 mass %
Flow rate: 1 mL/minute
Injection quantity: 0.1 mL
Detector: RI (differential refractometer)

[Storage Stability of Plastisol Composition]

A produced plastisol composition was held at 25° C. in a constant temperature water bath, and the initial viscosity was measured using a BM type viscometer (No. 4 rotor, manufactured by Toki Sangyo Co., Ltd.) with a speed of rotation of 6 rpm.

Subsequently, the plastisol composition was held at 30° C. in a thermostatic chamber, and after 1 week the composition was removed and the viscosity was measured using the same measurement conditions as the initial viscosity measurement.

Next, the thickening efficiency of the plastisol composition relative to the initial viscosity was determined using the following formula.

Thickening Efficiency (%)={(Viscosity following storage/initial viscosity)−1}×100

Based on this thickening efficiency, the storage stability was evaluated using the following evaluation standards.
◎: less than 40%
○: 40% or more and less than 60%
Δ: 60% or more and less than 100%
×: 100% or more

[Strength of Gelled Film]

A produced gelled film was peeled away from the substrate, cut into a dumbbell No. 3 shape to prepare a test piece. The strength of the test piece was then measured using a tensile tester. The measurement conditions included a test speed of 200 mm/min., a load cell rating of 980 N, and a surrounding temperature of 25° C.

The measured strength values were evaluated on the basis of the following evaluation standards.
◎: 3.0 MPa or more
○: 2.0 MPa or more and less than 3.0 MPa
Δ: 1.0 MPa or more and less than 2.0 MPa
×: less than 1.0 MPa

[Dispersion Medium Bleed Out from Gelled Film]

A vinyl chloride film of dimensions 50×50×0.07 (mm) was placed on the surface of a produced gelled film (50×50×2 (mm)), and the gelled film was then retained for 24 hours in a thermostatic chamber at 80° C. with a pressure of 200 Pa applied from the side of the vinyl chloride film.

The amount of dispersion medium bleed out from the gelled film was determined from the variation in the mass of the film across the duration of the test, using the following formula.

Amount of bleed out of dispersion medium (mg)= (film mass after testing)−(initial film mass)

The amount of bleed out of dispersion medium was then evaluated on the basis of the following evaluation standards.
◎: less than 5 mg
○: 5 mg or more and less than 10 mg
Δ: 10 mg or more and less than 30 mg
×: 30 mg or more

[Preparation of Polymer Particles (A1)]

500 g of pure water was placed in a 2 liter 4 neck flask equipped with a thermometer, a nitrogen gas inlet tube, a stirrer, a dropping funnel, and a cooling pipe, and nitrogen gas was bubbled through the water for 30 minutes to remove any residual dissolved oxygen from the pure water.

Subsequently, the nitrogen bubbling was changed to a nitrogen flow, and 16.3 g of methyl methacrylate and 12.5 g of n-butyl methacrylate were added, and with the mixture being stirred at 200 rpm, the temperature was raised to 80°

C. When the internal temperature had reached 80° C., 0.25 g of potassium persulfate dissolved in 10 g of pure water was added to the flask in a single batch to initiate the polymerization. Subsequently, stirring was continued at 80° C. for 60 minutes, yielding a seed particle dispersion. This polymerization is a soap-free polymerization that uses no emulsifiers.

Subsequently, a monomer emulsion produced by mixing, stirring, and emulsifying 128.5 g of methyl methacrylate, 121.5 g of n-butyl methacrylate, 2.50 g of sodium dioctylsulfosuccinate and 125.0 g of pure water was added dropwise to the seed particle dispersion over 2 hours. Stirring was then continued for a further 1 hour at 80° C., yielding a polymer dispersion of core particles.

Subsequently, a monomer emulsion produced by mixing, stirring, and emulsifying 250.0 g of methyl methacrylate, 2.50 g of sodium dioctylsulfosuccinate, and 125.0 g of pure water was added dropwise to the polymer dispersion of core particles over 2 hours. Stirring was then continued for a further 1 hour at 80° C., yielding a core/shell type polymer dispersion.

The core/shell type polymer dispersion was cooled to room temperature, and then spray dried using a spray dryer, yielding polymer particles (A1).

The drying conditions for the spray drying included an inlet temperature of 170° C., an outlet temperature of 75° C., and an atomizer rotational speed of 25,000 rpm.

The thus produced polymer particles (A1) had a volume average particle size of 0.79 μm, and a weight average molecular weight of 862,000 of primary particles.

[Preparation of Polymer Particles (A2) to (A4)]

With the exceptions of altering the monomers of the monomer emulsion which is added dropwise to the compositions shown in Table 1, and altering the quantity of the core to 250 g, and that of the shell to 250 g, polymer particles (A2) to (A4) were prepared using the same method as that used for the polymer particles (A1).

[Preparation of Polymer Particles (A5)]

500 g of pure water was placed in a 2 liter 4 neck flask equipped with a thermometer, a nitrogen gas inlet tube, a stirrer, a dropping funnel, and a cooling pipe, and nitrogen gas was bubbled through the water for 30 minutes to remove any residual dissolved oxygen from the pure water.

Subsequently, the nitrogen bubbling was changed to a nitrogen flow, and 16.3 g of methyl methacrylate and 12.5 g of n-butyl methacrylate were added, and with the mixture being stirred at 200 rpm, the temperature was raised to 80° C. When the internal temperature had reached 80° C., 0.25 g of potassium persulfate dissolved in 10 g of pure water was added to the flask in a single batch to initiate the polymerization. Subsequently, stirring was continued at 80° C. for 60 minutes, yielding a seed particle dispersion. This polymerization is a soap-free polymerization that uses no emulsifiers.

Subsequently, a monomer emulsion produced by mixing, stirring and emulsifying 431.9 g of methyl methacrylate, 68.1 g of t-butyl methacrylate, 5.0 g of sodium dioctylsulfosuccinate, and 250.0 g of pure water was added dropwise to the seed particle dispersion over 5 hours. Stirring was then continued for a further 1 hour at 80° C., yielding a polymer dispersion.

This polymer dispersion was cooled to room temperature, and then spray dried using a spray dryer, yielding polymer particles (A5).

The thus produced polymer particles (A5) had a volume average particle size of 0.82 μm, and a weight average molecular weight of 815,000 of primary particles.

TABLE 1

| Polymer particles | Core composition (mol ratio) | Core Sp value | Shell composition (mol ratio) | Shell Sp value | Primary particle size (μm) | Weight average molecular weight |
|---|---|---|---|---|---|---|
| A1 | MMA/n-BMA = 60/40 | 19.74 | MMA = 100 | 20.15 | 0.79 | 862,000 |
| A2 | MMA/n-BMA = 60/40 | 19.74 | MMA/GMA = 80/20 | 20.27 | 0.66 | 802,000 |
| A3 | MMA/MAA = 80/20 | 20.81 | MMA/MAA = 95/5 | 20.31 | 0.74 | 940,000 |
| A4 | MMA/n-BMA = 60/40 | 19.74 | MMA/n-BMA = 90/10 | 20.05 | 0.87 | 764,000 |
| A5 | MMA/t-BMA = 90/10 | 19.97 | — | — | 0.82 | 815,000 |

Abbreviations within the Table 1 are as follows:
MMA: methyl methacrylate
n-BMA: n-butyl methacrylate
t-BMA: t-butyl methacrylate
GMA: glycidyl methacrylate
MAA: methacrylic acid Example 1

To 100 parts by mass of the polymer particles (A1) was added 100 parts by mass of a polypropylene glycol with a weight average molecular weight of 700 (an average degree of polymerization of 12) (brand name: ADEKA POLYETHER P-700, manufactured by Asahi Denka Co., Ltd.) as a dispersion medium. This mixture was then mixed and stirred using a disper mixer, and then defoamed under reduced pressure, yielding a plastisol composition with the polymer particles dispersed uniformly. The initial viscosity of this plastisol composition was 1.5 Pa·s and the thickening efficiency was 52%, indicating good storage stability.

Furthermore, the thus obtained plastisol composition was applied to a glass plate to form a film of thickness 2 mm, and was then heated for 30 minutes at 140° C., yielding a gelled film.

This gelled film displayed very good film coating characteristics, with a strength of 2.8 MPa and the amount of bleed out of a dispersion medium of 0.0 mg.

Example 2

With the exception of using a polypropylene glycol with a weight average molecular weight of 2000 (an average degree of polymerization of 35) (brand name: Adeka polyether P-2000, manufactured by Asahi Denka Co., Ltd.) as the dispersion medium, a plastisol composition containing a uniform dispersion of polymer particles was prepared, and a gelled film was formed, using the same method as the example 1.

Example 3

With the exception of using (A2) for the polymer particles, a plastisol composition containing a uniform dispersion of polymer particles was prepared, and a gelled film was formed, using the same method as the example 1.

Example 4

With the exceptions of using (A3) for the polymer particles, and using a polyethylene glycol with a weight average molecular weight of 400 (an average degree of polymerization of 9.1) (brand name: polyethylene glycol 400, manufactured by Katayama Chemical Inc.) as the dispersion medium, a plastisol composition containing a uniform dispersion of polymer particles was prepared, and a gelled film was formed, using the same method as the example 1.

Example 5

With the exceptions of using (A4) for the polymer particles, and using a polybutylene glycol with a weight average molecular weight of 650 (an average degree of polymerization of 9.0) (brand name: PTG-650SN, manufactured by Hodogaya Chemical Inc.) as the dispersion medium, a plastisol composition containing a uniform dispersion of polymer particles was prepared, and a gelled film was formed, using the same method as the example 1.

Example 6

With the exception of adding 23.7 parts by mass of a blocked isocyanate containing tetramethylxylene diisocyanate (brand name: m-TMXDI, manufactured by Takeda Chemical Industries Ltd.) blocked with methyl ethyl ketoxime as a component (Z), a plastisol composition containing a uniform dispersion of polymer particles was prepared, and a gelled film was formed, in the same manner as the example 1.

Example 7

With the exception of adding 14.6 parts by mass of 3,5,5-trimethylhexanoic acid (brand name: Kyowanoic N, manufactured by Kyowa Hakko Kogyo Co., Ltd.), and 1.0 parts by mass of 1,2-dimethylimidazole as a component (Z), a plastisol composition containing a uniform dispersion of polymer particles was prepared, and a gelled film was formed, in the same manner as the example 1.

Example 8

With the exception of using the polymer particles (A5) instead of the polymer particles (A1), a plastisol composition containing a uniform dispersion of polymer particles was prepared and a gelled film was formed, in the same manner as the example 1.

Example 9

To 100 parts by mass of the polymer particles (A2) was added 100 parts by mass of a polypropylene glycol with a weight average molecular weight of 2000 (an average degree of polymerization of 34) as a dispersion medium, and 7.7 parts by mass of hexahydrophthalic anhydride (brand name: Rikacid HH, manufactured by New Japan Chemical Co., Ltd.) as a component (Z). This mixture was then mixed and stirred using a disper mixer, and then defoamed under reduced pressure, yielding a plastisol composition with the polymer particles dispersed uniformly. The initial viscosity of this plastisol composition was 9.5 Pa·s and the thickening efficiency was 39%, indicating good storage stability.

Furthermore, the obtained plastisol composition was used to form a gelled film in the same manner as the example 1.

Comparative Example 1

With the exception of adding 100 parts by mass of diisononylphthalic acid (DINP) as a dispersion medium to 100 parts by mass of vinyl chloride polymer particles (brand name: Zeon 121, manufactured by Zeon Corporation), a plastisol composition was prepared, and a gelled film was formed, using the same method as the example 1.

Comparative Example 2

With the exception of adding 100 parts by mass of diisononylphthalic acid (DINP) as a dispersion medium to 100 parts by mass of the produced polymer particles (A4), a plastisol composition was prepared, and a gelled film was formed, using the same method as the example 1.

Comparative Example 3

With the exception of adding 100 parts by mass of tricresyl phosphate (TCP) as a dispersion medium to 100 parts by mass of the produced polymer particles (A4), a plastisol composition was prepared, and a gelled film was formed, using the same method as the example 1.

Comparative Example 4

With the exception of adding 50 parts by mass of dipropylene glycol dibenzoate (DPG-BZ) and triethylene glycol bis-2-ethylbutyrate (TEG-2EB) as a dispersion medium to 100 parts by mass of the produced polymer particles (A1), a plastisol composition was prepared, and a gelled film was formed, using the same method as the example 1.

Comparative Example 5

With the exception of adding 100 parts by mass of diethylene glycol dibenzoate (DEGB) as a dispersion medium to 100 parts by mass of the produced polymer particles (A1), a plastisol composition was prepared using the same method as the example 1. The obtained plastisol composition gelled during the storage stability test and displayed poor storage stability.

The results of the evaluations of the examples 1 to 5 are shown in Table 2. The results of the evaluations of the examples 6 to 9 are shown in Table 3. The results of the evaluations of the comparative examples 1 to 5 are shown in Table 4.

TABLE 2

|  | Example 1 | Example 2 | Example 3 | Example 4 | Example 5 |
|---|---|---|---|---|---|
| Dispersion medium (X) | P700 | P2000 | P700 | PEG | PBG |
| Polymer particles (Y) | A1 | A1 | A2 | A3 | A4 |
| Compound (Z) | — | — | — | — | — |
| Initial viscosity (Pa · s) | 1.5 | 10.1 | 1.2 | 2.5 | 2.0 |
| Thickening efficiency (%) | 52 | 17 | 33 | 45 | 54 |
| Storage stability | ○ | ◎ | ◎ | ○ | ○ |
| Strength (MPa) | 2.8:○ | 4.1:◎ | 3.2:◎ | 3.5:◎ | 2.4:○ |
| Amount of bleed out of dispersion medium (mg) | 0.0:◎ | 0.0:◎ | 0.0:◎ | 0.0:◎ | 3.0:◎ |

TABLE 3

|  | Example 6 | Example 7 | Example 8 | Example 9 |
|---|---|---|---|---|
| Dispersion medium (X) | P700 | P700 | P700 | P2000 |
| Polymer particles (Y) | A1 | A2 | A5 | A2 |
| Compound (Z) | BI | DMI | — | HHF |
| Initial viscosity (Pa · s) | 8.2 | 4.9 | 2.4 | 9.5 |
| Thickening efficiency (%) | 42 | 27 | 22 | 39 |
| Storage stability | ○ | ⊚ | ⊚ | ⊚ |
| Strength (MPa) | 4.5:⊚ | 1.8:Δ | 2.3:○ | 5.2:⊚ |
| Amount of bleed out of dispersion medium (mg) | 0.0:⊚ | 0.0:⊚ | 0.0:⊚ | 0.0:⊚ |

Abbreviations within the Table 2 and the Table 3 are as follows:
P700: polypropylene glycol (weight average molecular weight 700, average degree of polymerization 12)
P2000: polypropylene glycol (weight average molecular weight 2000, average degree of polymerization 34–35)
PEG: polyethylene glycol (weight average molecular weight 400, average degree of polymerization 9.1)
PBG: polybutylene glycol (weight average molecular weight 650, average degree of polymerization 9.0)
BI: blocked isocyanate containing tetramethylxylene diisocyanate blocked with methyl ethyl ketoxime
TMH: 3,5,5-trimethylhexanoic acid
DMI: 1,2-dimethylimidazaole
HHF: hexahydrophthalic anhydride

TABLE 4

|  | Comparative Example 1 | Comparative Example 2 | Comparative Example 3 | Comparative Example 4 | Comparative Example 5 |
|---|---|---|---|---|---|
| Dispersion medium (X) | DINP | DINP | TCP | DPG-BZ/TEG-2EB | DEGB |
| Polymer particles (Y) | PVC | A4 | A4 | A1 | A1 |
| Compound (Z) | — | — | — | — | — |
| Initial viscosity (Pa · s) | 0.8 | 1.8 | 2.7 | 3.1 | 1.5 |
| Thickening efficiency (%) | 42 | 28 | 58 | 18 | gelled |
| Storage stability | ○ | ⊚ | ○ | ⊚ | X |
| Strength (MPa) | 3.8:⊚ | 3.2:⊚ | 3.2:⊚ | 3.5:⊚ | 0.9:X |
| Amount of Bleed out dispersion medium (mg) | 28.4:Δ | 38.6:X | 32.5:X | 30.5:X | 7.6:○ |

Abbreviations within the Table 4 are as follows:
PVC: polyvinyl chloride polymer particles
DINP: diisononylphthalic acid
TCP: tricresyl phosphate
DPG-BZ: dipropylene glycol dibenzoate
TEG-2EB: triethylene glycol bis-2-ethylbutyrate
DEGB: diethylene glycol dibenzoate

[Observations from Each of the Examples and the Comparative Examples]

Examples 1 to 5

The examples 1 to 3 are examples which used polypropylene glycol as the dispersion medium, whereas the example 4 used polyethylene glycol as the dispersion medium, and the example 5 used polybutylene glycol as the dispersion medium.

Each of the plastisol compositions prepared in the examples 1 to 5 displayed good storage stability and good workability.

Furthermore, the gelled films obtained by applying and heating the plastisol compositions displayed good strength, and almost no bleed out of the dispersion medium.

Examples 6 and 7

The examples 6 and 7 are examples of plastisol compositions containing a compound which reacts with the hydroxyl groups of the polypropylene glycol. These plastisol compositions displayed even better storage stability than the example 1, which contained no such added compound, and the workability was also good.

The gelled films obtained by applying and heating these plastisol compositions contained almost no residual low molecular weight fraction, displayed absolutely no bleed out of the dispersion medium, and also provided good strength.

Example 8

The example 8 is an example of a plastisol composition which used a copolymer of methyl methacrylate and t-butyl methacrylate as the polymer particles, and polypropylene glycol as the dispersion medium. These polymer particles did not display compatiblity with polypropylene glycol, and consequently the plastisol composition had extremely good storage stability, as well as good workability.

When this plastisol composition was applied and heated, elimination of isobutylene causes a conversion to a compatible resin, and consequently the produced gelled film displayed completely no bleed out of the dispersion medium, and also provided good strength.

Example 9

The example 9 is an example of a plastisol composition containing an added acid anhydride which reacts with the hydroxyl groups of the polypropylene glycol. The plastisol composition had extremely good storage stability, as well as good workability.

The gelled film obtained by applying and heating this plastisol composition displayed completely no bleed out of the dispersion medium, and also provided good strength.

Comparative Example 1

The comparative example 1 is a plastisol composition which used polyvinyl chloride polymer particles, and a phthalic acid based plasticizer as the dispersion medium. This plastisol composition displayed good storage stability and good workability. However, because the composition uses halogen atom containing polymer particles, it suffers from an environmental problem in that it emits materials such as dioxin on incineration.

Furthermore, the gelled film obtained by applying and heating this plastisol composition displayed a large amount of bleed out of the dispersion medium, and a good gelled film was not obtained.

Comparative Example 2

The comparative example 2 is a plastisol composition which used acrylic based polymer particles, and a phthalic acid based plasticizer as the dispersion medium. This plastisol composition displayed good storage stability and good workability.

However, the gelled film obtained by applying and heating this plastisol composition displayed a large amount of bleed out of the dispersion medium, and a good gelled film was not obtained.

Comparative Example 3

The comparative example 3 is a plastisol composition which used acrylic based polymer particles, and a phosphoric acid based plasticizer as the dispersion medium. This plastisol composition displayed good storage stability and good workability.

However, the gelled film obtained by applying and heating this plastisol composition displayed a large amount of bleed out of the dispersion medium, and a good gelled film was not obtained.

Comparative Example 4

The comparative example 4 is a plastisol composition which used acrylic based polymer particles, and a combination of an ether ester based plasticizer and a benzoate ester plasticizer as the dispersion medium. This plastisol composition displayed good storage stability and good workability.

However, the gelled film obtained by applying and heating this plastisol composition displayed a large amount of bleed out of the dispersion medium, and a good gelled film was not obtained.

Comparative Example 5

The comparative example 5 is a plastisol composition which used acrylic based polymer particles, and diethylene glycol dibenzoate as the dispersion medium. This plastisol composition displayed no good storage stability and workability.

Furthermore, the gelled film obtained by applying and heating this plastisol composition also displayed no good strength.

INDUSTRIAL APPLICABILITY

A plastisol composition of the present invention uses non-halogen based polymer particles with no halogen atoms, which do not emit materials such as hydrogen chloride gas or dioxin on incineration, and does not require a phthalic acid based plasticizer as a dispersion medium, and consequently provides an extremely large reduction in environmental impact. Furthermore, by using the plastisol composition, a gelled film having no bleed out of the dispersion medium, superior dispersion medium retention characteristics, workability, and processability is obtained. In addition, by using the plastisol composition of the present invention, a gelled film or an article with excellent mechanical characteristics are provided.

The present invention can also be implemented in a variety of other modified forms, provided such modifications do not deviate from the burden of the invention. The examples described above merely represent a series of different examples, and must not be interpreted as limiting in any way. Furthermore, the scope of the present invention is defined by the scope of the claims, and is in no way restricted by the main body of text of this description. In addition, modifications and variations which fall within an equivalent scope to that of the present invention are all deemed as falling within the scope of the present invention.

The invention claimed is:

1. A plastisol composition comprising a at least one compound (X), and polymer particles (Y),
   wherein said at least one compound (X) is represented by a general formula (1) shown below:

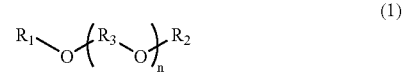

(wherein, $R_1$ and $R_2$ each represent a hydrogen atom or an alkyl group having 1 to 10 carbon atoms, $R_3$ represents a straight chain or branched alkylene group having 2 to 12 carbon atoms, and n which represents an integer within a range from 5 to 200), and said polymer particles (Y) comprise, as components, (1) and (2), or (1) and (3), wherein (1) represents methyl methacrylate units, (2) represents methacrylate ester units (A1) which are esters of an alcohol having 2 to 8 carbon atoms and methacrylic acid, and/or acrylate ester units (A2) which are esters of an alcohol having 1 to 8 carbon atoms and acrylic acid, and (3) represents monomer units (B) which comprise at least one type of high polarity functional group selected from the group consisting of carboxyl groups, sulfonic acid groups, phosphoric acid groups, and epoxy groups.

2. A plastisol composition according to claim 1, wherein said at least one compound (X) is at least one compound selected from the group consisting of polyethylene glycol, polypropylene glycol, and polybutylene glycol.

3. A plastisol composition according to claim 1, wherein said polymer particles (Y) are particles with a core/shell structure or a gradient structure.

4. A plastisol composition according to claim 1, wherein said polymer particles (Y) have primary particles with a volume average particle size for primary particles of 0.01 to 50.0 μm.

5. A plastisol composition according to claim 1, wherein said polymer particles (Y) are powder formed by spray drying.

6. A plastisol composition according to claim 1, wherein said at least one compound (X) is polyethylene glycol, and said polymer particles (Y) have a solubility parameter of 20.5 or less.

7. A plastisol composition according to claim 1, wherein said at least one compound (X) is polypropylene glycol, and said polymer particles (Y) have a solubility parameter within a range from 19.8 to 20.5.

8. A plastisol composition according to claim 1, wherein said at least one compound (X) is polybutylene glycol, and said polymer particles (Y) have a solubility parameter of 19.6 or more.

9. A plastisol composition according to claim 1, wherein said at least one compound (X) contains a hydroxyl group, and said plastisol composition further comprises a compound (Z) having a functional group which reacts with said hydroxyl group.

10. A gelled film comprising a dispersion medium, in which an amount of bleed out of said dispersion medium is 1% or less of a total amount of the dispersion medium when a vinyl chloride film of dimensions 50×50×0.07 (mm) is placed on a surface of a gelled film of dimensions 50×50×2 (mm), and said gelled film is then retained for 24 hours at 80° C. with a pressure of 200 Pa applied from a side of said vinyl chloride film, which gelled film is a film produced by gelling a plastisol composition according to claim 1.

11. A plastisol composition according to claim 1, wherein said polymer particles (Y) comprise, as components, (1) and (2).

12. A plastisol composition according to claim 1, wherein said polymer particles (Y) comprise, as components, (1) and (3).

13. A plastisol composition according to claim 1, wherein said at least one compound (X), and polymer particles (Y), are present in a mass ratio of (X) to (Y) of 30/70 to 70/30.

* * * * *